United States Patent [19]

Slama

[11] 3,987,125

[45] Oct. 19, 1976

[54] TRANSLUCENT IMPACT POLYSTYRENE USING PARTIALLY BROMINATED RUBBERS

[75] Inventor: Francis J. Slama, Aurora, Ill.

[73] Assignee: Standard Oil Company, Chicago, Ill.

[22] Filed: Apr. 30, 1975

[21] Appl. No.: 573,310

[52] U.S. Cl. .......................... 260/880 R
[51] Int. Cl.² ............................ C08L 9/06
[58] Field of Search ............ 260/3.5, 879, 880 R

[56] References Cited
UNITED STATES PATENTS

| | | | |
|---|---|---|---|
| 3,085,074 | 4/1963 | Burke | 260/879 |
| 3,144,426 | 8/1964 | Burke | 260/879 |
| 3,293,226 | 12/1966 | de Schrijver | 260/879 |
| 3,503,905 | 3/1970 | Zuern | 260/880 R |
| 3,639,522 | 2/1972 | Narayana | 260/880 R |
| 3,721,634 | 3/1973 | Versnel | 260/879 |

*Primary Examiner*—Paul R. Michl
*Attorney, Agent, or Firm*—Wallace L. Oliver; Arthur G. Gilkes; William T. McClain

[57] ABSTRACT

Translucent rubber-modified styrene polymers are prepared by using halogenated rubbers in the polymerization feedstock.

10 Claims, No Drawings

TRANSLUCENT IMPACT POLYSTYRENE USING PARTIALLY BROMINATED RUBBERS

BACKGROUND OF THE INVENTION

This invention relates to translucent rubber-modified styrene polymers.

There is a need for impact resistant styrene polymers which are translucent or transparent. Impact resistance now is imparted to styrene polymers by polymerizing styrene in the presence of 3 to 10% of various rubber compounds such that discrete rubber-polystyrene phases are incorporated within a styrene homopolymer matrix. Unfortunately for some applications, these rubber-modified styrene polymers usually are opaque. To be commercially acceptable, a suitable translucent impact resistant polystyrene should have a notched Izod value of at least 0.6 foot-pound/inch of notch and a translucency index of at least 7 on a scale from 1 to 10.

One approach to this problem is described in British Pat. No. 1,185,122 which recommends the addition of 0.05 to 2% of β-bromostyrene to the polymerization feedstock in order to produce a transparent rubber-modified polystyrene. However, polymeric compositions produced using the method disclosed in this British Patent can have an undesirable brownish color.

It is an object of this invention to produce an impact resistant translucent styrene polymer. Another object of this invention is to produce such a polymer which is not discolored. Still another object of this invention is to provide brominated rubbers which can be incorporated within a styrene polymerization feedstock providing an impact resistant translucent polymer and which will not corrode a polymerization reactor vessel.

SUMMARY OF THE INVENTION

My invention is a method for producing translucent, impact resistant polymers comprising the steps:
a. combining into a polymerization feedstock containing 2 to 20% of a partially brominated rubber, having a bromine content of 0.1 to 6% dissolved in a vinyl aromatic monomer;
b. polymerizing the feedstock; and
c. recovering the polymer,
whereby the Izod value of the polymer is at least 0.6 and the translucency index of the polymer is at least 7.

DESCRIPTION OF THE INVENTION

I have found that the translucent rubber-modified vinyl aromatic polymers can be improved significantly by the incorporation of a lightly brominated rubber within the impact styrene polymer. Specifically, I find that use in an impact polystyrene of a rubber component which has been brominated at a low, but effective level yields a sufficiently translucent and impact styrene polymeric material.

The mechanism of the observed effect remains uncertain. One theory is that chain transfer activity is involved in translucency improvement. It was observed that many polymerization runs in which translucency was improved involved additives which are probable good chain transfer agents. Similarly, additives which are ineffective, such as the aryl bromides, have low chain transfer constants. However, if the bromine effect is due simply to chain transfer activity, some effect might be observed using other chain transfer agents. A styrene-rubber polymerization run was made using 0.005 mol n-dodecyl-mercaptan. Although this mercaptan level was higher than the bromide runs and although mercaptan has a higher chain transfer constant than most bromine additives, no increase in translucency was observed in the mercaptan run. It is believed that when a mercaptan is involved in a chain transfer, the active site is destroyed while with bromine additive there is persistent chain transfer activity.

In gel tests carried out by the method described in Ruffing U.S. Pat. No. 3,243,481, the level of dry gel in a typical run made without bromine is two to three times the rubber level, while in runs using brominated rubber or bromine-containing additives present, the dry gel level is three to four times the rubber level. The higher level of dry gel in the bromine runs indicates that these runs contain more entrapped and/or grafted polystyrene. The higher level of entrapped polystyrene is also evident in electron photomicrographs. Comparing photomicrographs of runs made with and without a bromine additive, in bromine-containing runs the particles have relatively more entrapped polystyrene, thinner rubber walls, and a more uniform, cellular rubber structure. The Ruffing gel data and the electron micrographs, therefore, both indicate that there is more entrapped polystyrene in the rubber particles in bromine runs. One explanation of this data is that the increased translucency in bromine runs is caused by the alteration in particle morphology.

An alternate explanation for the bromine effect arises from the appearance of phase contrast photomicrographs. In bromine runs with improved translucency the contrast is noticeably less than in runs made without bromine. This observation suggests that the refractive index of the rubber increased in bromine runs, thereby decreasing the difference between the refractive index of the rubber and of the polystyrene. This increase in rubber refractive index could be brought about by increased grafting and crosslinking in the presence of bromine. Increased grafting would serve to explain the change in particle morphology and the increase in gel content caused by bromine, while an increase in crosslinking would reduce the difference in refractive indices between the two phases.

Still another possibility which has been considered is that the bromine itself either decreases the refractive index of the polystyrene or increases the refractive index of the rubber. That the former is not true was demonstrated by isolating the matrix from six of the runs. The refractive indices of these matrices were essentialy the same as that of unmodified polystyrene.

It was similarly shown that the refractive index of the rubber is not increased by bromine per se. Refractive indices were determined for four brominated rubbers and were found to be similar to those of the raw rubber. The rubbers used in this test were Goodyear 1288 and Firestone Diene 55.

In summary, three possible explanations have been considered for the increases in translucency observed in certain bromine runs. One favored explanation is that the change in rubber particle morphology causes the change in translucency. Another possibility is that the refractive index of the rubber is increased by grafting and/or crosslinking, thereby decreasing the difference in refractive index between the rubber and the polystyrene. The third possibility, that the difference in refractive index between polystyrene and rubber is decreased directly by incorporation of bromine into polystyrene and/or rubber, is improbable.

In selecting a lightly brominated rubber which is useful in producing translucent impact polystyrene several competing factors must be weighed. Not only should both the translucence level and toughness must be adequate, but, there should not be any discoloration due to the bromine and the bromo compound should not corrode the reactor vessel.

Lightly brominated rubbers suitable for use in this invention conveniently can be prepared from the rubbers which customarily are incorporated within impact polystyrene. Such rubbers include polybutadiene (PBD) and butadiene-styrene (SBR) rubbers prepared by solution or emulsion methods. A typical example is polybutadiene rubber, prepared in solution from polybutadiene, which contains about 2000 carbon-carbon double bonds per molecule. I have found that bromination of about 15 of these double bonds per molecule, and subsequent incorporation of this material in an impact polystyrene results in a striking increase in translucency of the product while retaining reasonable impact properties. Typically, useful PBD rubbers are linear and branched polymers of butadiene containing from 25 to 99% cis content with less that 20% free vinyl unsaturation (i.e., 1, 2-addition). A commonly used PBD would contain 58% trans, 27% cis and 15% free vinyl unsaturation. Solution viscosities for useful PBD's range from 25 to 200 centipoise and preferably range from 70 to 190 centipoise measured at a concentration of 5% by weight in styrene at 30° C. Useful SBR rubbers are random or block copolymers of butadiene and styrene, or combinations thereof, with 5 to 50% bound styrene. Typical solution viscosities are 30 to 120. These rubbers can be present in styrene polymer at levels from about 2 to 20% and typically from about 3 to 10%.

The levels at which bromination of a rubber is effective in this invention range from about 0.1 to 6.0 weight percent of the rubber and preferably from 0.5 to 4.0 weight percent. Insufficient bromination is not effective for translucence improvement while too much bromination leads to excessive retardation and chain transfer which produces a low molecular weight product. Using 4% Firestone Diene 55 PBD in styrene a bromination level in the rubber of 2.0% was found optimum. Although these percentages are believed optimum for the polymerization conditions tested, it is not possible to give the optimum concentration for all reaction conditions and polymer compositions. For example, if the percent of rubber is increased the amount of bromination can be increased without decreasing the impact characteristics below an unacceptable level. Further, the type of rubber that is used will affect the balance between impact strength and translucency. If a specific non-brominated rubber type yields fairly good translucent impact polystyrene, a bromination of that rubber usually will not greatly enhance the properties. The greatest effect is observed in a rubber which inherently does not yield translucent polystyrene. However, within the broad range of 0.1 to 6.0% bromination there should be an effective concentration at which the resulting styrene polymer has improved translucency with impact properties.

At the bromination level prescribed there was neither discoloration of the impact resistant polymer nor was there any detectable corrosion of the reactor vessel.

Although styrene is the preferred monomer in my invention other vinyl aromatic monomers such as alpha-methylstyrene can be used in conjunction with my additives. In addition to the vinyl aromatic monomer and rubber, up to about 10% of other materials can be included in the polymerization feedstock, such as stabilizers, antioxidants, colorants, flame retardants, and lubricants.

In testing brominated rubbers in impact polystyrene, the general mass thermal polymerization procedure was to prepare about 2000 grams of feedstock by dissolving rubber and additives in styrene monomer. This feedstock was placed in an agitated ½ gallon Chemco reactor for about 6 to 9 hours during which time the temperature ranged from about 120° to 210° C. Especially when brominated rubbers are used, agitation should be reduced at the point where phase inversion begins. Continued vigorous agitation after that point can lead to an unsuitable product. The polymer was recovered by removing the material from the reactor, grinding it, and passing it through a devolatilizing extruder.

As an illustration of the bromination technique, the brominated rubber used in Example 1 was prepared in subdued light by adding dropwise, over a period of 30 minutes, 2 grams of bromine in 150 milliliters of hexane to a solution of 150 grams of Firestone Diene 55 in 1900 grams of hexane in a 5000 ml 3-neck flask fitted with a dropping funnel and mechanical stirrer. The hexane was removed by drying at room temperature leaving a rubber with a 2% bromination level. The brominated rubbers used in the other Examples and Runs were prepared similarly.

Translucency was measured by making a compression molded chip of polymer of about 50 mils thickness and placing it in contact with a printed sheet of paper. The clarity of the printing as viewed through the chip is a measure of "contact" translucency. Using this method samples are ranked in clarity from 1 to 10, with crystal polystyrene ranking 10 and a sample through which the printing is barely discernable ranking 1. Monsanto styrene polymer LP-61 ranks 7. A polymer with a ranking of 7 has a luminous transmittance value over about 68%.

The testing procedure used the mass thermal polymerization technique, although my invention is not limited to any specific method of polymerization. Another conventional polymerization method in which the partially brominated rubber of my invention can be incorporated is mass suspension. Typically, polymer is recovered by removing polymerized material from a reactor, either continuously or batchwise, devolatilizing the polymer to remove traces of nonpolymerized material, and chopping or grinding the polymer into convenient particle size. The results of my tests are summarized in Table I.

TABLE I

| Example (Run) | Wt. % Rubber | Rubber Type[1] | Wt. % Br in Rubber | Translucency | ASTM | | | | | |
|---|---|---|---|---|---|---|---|---|---|---|
| | | | | | Izod[2] | Elongation[3] | YTS[4] | UTS[5] | HDT[6] | MFR[7] |
| Ex I | 8.0 | B-55 | 2.0 | 7 | 1.28 | 49 | 2500 | 2600 | 147 | 12 |
| Ex II | 8.0 | B-55 | 3.0 | 7 | 1.40 | 39 | 3500 | 3000 | 169 | 5.6 |
| Ex III | 4.0 | B-1288 | 1.0 | 7 | 0.67 | 37 | 4300 | 4300 | 170 | 8.8 |

TABLE I-continued

| Example (Run) | Wt. % Rubber | Rubber Type[1] | Wt. % Br in Rubber | Trans- lucency | ASTM | | | | | |
|---|---|---|---|---|---|---|---|---|---|---|
| | | | | | Izod[2] | Elon- gation[3] | YTS[4] | UTS[5] | HDT[6] | MFR[7] |
| Run 1 | 8.0 | B-55 | 1.0 | 5 | 1.87 | 50 | 2700 | 2800 | 171 | 4.1 |
| Run 2 | 4.0 | 1288 | 0 | 7 | 0.73 | 39 | 4400 | 4400 | 176 | 6.0 |
| Run 3 | 4.0 | 55 | 0 | 6 | 0.57 | 13 | 4100 | 4100 | 178 | 14 |
| Run 4 | 4.0 | 55 | 0 | 4 | 1.08 | 11 | 5100 | 5000 | 181 | 5.2 |
| Run 5 | 8.0 | 55 | 0 | 2 | 1.56 | 40 | 2900 | 3100 | 175 | 6.3 |

[1]55 is Firestone Diene 55, a solution PBD
B-55 is brominated Firestone Diene 55
1288 is Goodyear 1288, an emulsion SBR, 23% styrene SBR
B-1288 is brominated Goodyear 1288
[2](ft–lb/in of notch)ASTM D256-70 (1/4 inch bar)
[3](%) ASTM D638-68 (Type I at 0.2 in/min.)
[4]YTS = Yield Tensile Strength (lb/in$^2$) ASTM D638-68 (Type I at 0.2 in/min.)
[5]UTS = Ultimate Tensile Strength (lb/in$^2$) ASTM D638-68 (Type I at 0.2 in/min.)
[6]HDT = Heat Distortion Temperature (° F.) ASTM D648-56 (1/4 in bar at 264 psi)
[7]MFR = Melt Flow Rate (g/10 min.) ASTM D1238-70 (Condition G)

I claim:

1. A method for producing translucent, impact resistant polymers comprising:
   a. dissolving 2 to 20% of a polybutadiene or styrene-butadiene rubber, partially brominated by addition of molecular bromine, having a bromine content of 0.1 to 6%, into a polymerization feedstock containing a vinyl aromatic monomer;
   b. polymerizing the feedstock; and
   c. recovering the polymer, whereby the Izod value of the polymer is at least 0.6 and the translucency index of the polymer is at least 7.

2. The method of claim 1 where the vinyl aromatic monomer is styrene monomer.

3. The method of claim 2 where the feedstock is polymerized using the mass thermal polymerization technique.

4. The method of claim 3 where the rubber has a bromine content of 0.5 to 4.0%.

5. The method of claim 3 where the rubber is a solution polybutadiene rubber.

6. The method of claim 5 where the rubber has a bromine content of 2 to 3%.

7. A translucent, impact resistant polystyrene with an Izod value of at least 0.6 and a translucency index of at least 7 containing 2 to 20% of a polybutadiene or styrene-butadiene rubber, partially brominated by addition of molecular bromine, having a bromine content of 0.1 to 6%.

8. The polystyrene of claim 7 where the rubber is a solution polybutadiene rubber.

9. The polystyrene of claim 8 where the rubber has a bromine content of 0.5 to 4.0%.

10. The polystyrene of claim 8 where the rubber has a bromine content of 2 to 3%.

* * * * *